United States Patent [19]

Fackrell et al.

[11] Patent Number: 5,487,913
[45] Date of Patent: Jan. 30, 1996

[54] BUTTER PRODUCTS

[75] Inventors: Robert N. Fackrell; Lorenzo P. Griffeth, both of Preston, Id.

[73] Assignee: Creamery Hollow U.S.A., Inc., Preston, Id.

[21] Appl. No.: 221,068

[22] Filed: Mar. 31, 1994

[51] Int. Cl.⁶ .................... A23C 15/16; A23C 15/06; A23C 15/18; A23D 7/015

[52] U.S. Cl. .................... 426/663; 426/603; 426/583; 426/586

[58] Field of Search ..................... 426/663, 603, 426/583, 586

[56] References Cited

U.S. PATENT DOCUMENTS

| | | | |
|---|---|---|---|
| 3,615,718 | 10/1971 | Weinstein | 426/565 |
| 4,769,255 | 9/1988 | Ahmed et al. | 426/603 |
| 4,770,892 | 9/1988 | Grealy et al. | 426/613 |
| 5,084,295 | 1/1992 | Whelan et al. | 426/565 |

*Primary Examiner*—Jeanette Hunter
*Assistant Examiner*—Choon P. Koh
*Attorney, Agent, or Firm*—Hughes, Multer, & Schacht

[57] ABSTRACT

Reduced fat content butter products prepared from dairy cream. Lecithin and/or a stabilizer can be added to the dairy cream to optimize the product. Dairy products—milk, skim milk, and dairy fats—are employed as required to adjust the fat content of the product; and optional ingredients may be added to, inter alia: adjust the texture of the product, inhibit oxidation and otherwise extend shelf life, alter color, and enhance flavor. The product may have a fat content low enough to qualify it as a reduced fat or even a light (or lite) butter. The product may have the firmness of conventional firm butter or be spreadable at refrigeration temperatures.

49 Claims, 2 Drawing Sheets

BUTTER PRODUCTS

The present invention relates to food products and, more specifically, to novel, improved, reduced fat butters and other reduced fat content butter products.

The term "reduced fat" is used herein as in 21 CFR §101.62 to designate a butter with a fat content at least 25 percent lower than that of conventional butter.

As is discussed below, there are occasions in which a butter product with a fat content greater than that permitted in a product labeled reduced fat butter but nevertheless lower than the 80 percent fat content of conventional butter can be used to advantage. The term "reduced fat content butter product" is used herein generically to embrace those products and reduced fat butters.

BACKGROUND OF THE INVENTION

Nutritional experts currently believe that the risk of cardiovascular disease can be decreased by reducing one's consumption of saturated fats. As conventional butter is required by federal law (Act of 4 Mar. 1923) to have a fat content of at least eighty percent, compliance with current nutritional guidelines essentially requires that the use of this flavorful and widely used spread be curtailed or that it be eliminated from one's diet.

Acceptable substitutes for butter have not heretofore been available. Margarines—butter substitutes made from vegetable fats—only remotely resemble butter in the all-important characteristic of taste. In fact the taste is so inferior that margarines are often entirely avoided by discriminating consumers. Furthermore, margarines employ palm and other saturated vegetable oils and/or vegetable oils which are hydrogenated and thereby partially saturated to impart a requisite degree of solidity to the product. Such margarines may be no more nutritionally acceptable than butter is.

It would also be desirable for a conventional butter replacement to have an important property which conventional butter does not—spreadability after having been held at low temperatures. It is common to refrigerate butter at a temperature of 35°–45° F. At this temperature conventional butter can not be spread easily, if at all; and this is typically annoying and/or inconvenient.

U.S. Pat. No. 4,769,255 issued 6 Sep. 1988 to Ahmed et al. does disclose one process for making a butter product that is spreadable at refrigeration temperatures, and the fat content of the patented butter replacers can be low enough for the reduced fat label to be legitimately appended to them. However, the Ahmed et al. process has the disadvantage of requiring ultrafiltration of the oil-in-water emulsion from which the butter replacer is made. Ultrafiltration equipment requires a significant financial investment and furthermore generates a waste product which presents a significant disposal problem in that it cannot be dumped or discharged into a sewer.

It will be apparent to the reader that there is therefore an existing and continuing need for a spread which has the taste, mouthfeel, and other attributes of butter but has a significantly reduced fat content and can therefore be used without ingesting the high levels of saturated fat appurtenant to conventional butter. There is a similar need for a process which can be employed to make a butter replacement of significantly lower fat content which has the attributes of conventional butters and which, in addition, is spreadable at refrigeration temperatures.

SUMMARY OF THE INVENTION

Reduced fat butters and other reduced fat content butter products which can be made at acceptable cost and without the generation of polluting effluents and which can furthermore be so made as to be spreadable at refrigeration temperatures have now been invented and are disclosed herein.

The essential ingredient of these novel butter products is dairy cream (sweet cream or whey cream). Optimal products may be obtained by the addition of lecithin or a stabilizer or both a stabilizer and lecithin. Milk, skim milk, and dairy fats can be employed if and as necessary to adjust the fat content of the product, and there are a number of other optional ingredients which can be employed to advantage. These include: (1) milk protein concentrates and whey protein concentrates, which are used as texturing agents and to control the firmness of the product; (2) salt, which is a flavorant; (3) the preservative and antioxidant Vitamin E (tocopherol); (4) Vitamin A palmitate which is employed as necessary to ensure that the butter product has a sufficiently high Vitamin A content for the product to be labelled a butter; (5) a coloring agent (typically beta carotene or annatto); (6) potassium sorbate and sodium benzoate or other shelf life extenders such as sodium citrate or disodium phosphate; (7) flavor enhancing and shelf life extending constituents—bacterial cultures and cultured skim milk; and (8) flavorants, typically flavor enhancers rather than flavor modifiers.

Butter products as disclosed herein may have a fat content ranging from well above 60 percent, the maximum permitted in a reduced fat butter, down to 25 percent. Products with fat contents below about 32 percent tend to be significantly less flavorful. Products with fat contents above 60 percent have a tendency to be rigid and less spreadable and are intended primarily for commercial bakery use.

The reduced fat content butter products of the present invention are made by first adjusting the fat content of the dairy cream to the extent necessary for the product to have the selected fat content with milk (decreases fat content), or a milk fat (increases fat content). This step is omitted if the dairy cream has that fat content which will give a product with the wanted fat content.

Any optional ingredients that are to be employed are then mixed into the dairy cream until they are uniformly distributed. The cream or blend is heated to an elevated temperature and held at that temperature for a long enough period of time to pasteurize the product and to develop flavor in the product with the flavor becoming nuttier as the heating is continued.

Next, if employed, the lecithin and/or the stabilizer are added to the pasteurized stock or mixture; and the temperature of the resulting blend is dropped to a lower level at which the blend can be successfully homogenized. If milk protein concentrates and/or whey protein concentrates are present, the pre-pasteurization blend is held at an elevated temperature for a period long enough to promote rehydration of the proteins in the concentrate(s)—which come in powder form—prior to pasteurization and homogenization.

Homogenization is preferably effected in a two-stage homogenizer. By the end of the homogenization step the blend will have undergone a phase reversal, forming a predominantly liquid-in-fat dispersion. The spreadability of the product being made is controlled by the pressure(s) at which the homogenizer is operated, typically in combination with lecithin and a stabilizer and (optionally) the protein concentrate(s). Higher pressures produce a firmer product and lower pressures a softer product which is typically spreadable at refrigeration temperatures.

The still hot, homogenized substance has a thick, puddinglike consistency. The product may be packaged hot.

Alternatively, it is cooled and then packaged or first whipped and then packaged if a whipped product is wanted.

The novel reduced fat content butter products of the present invention have a flavor closely resembling, if at all distinguishable from, that of a conventional (full fat) butter unlike products made as described in the above-cited '255 patent which taste more like cream cheese. The consistency of the reduced fat content butter product can be anywhere from hard to very soft and spreadable at refrigeration temperatures, and whipped butter can be made. Extended shelf life is another feature of the novel reduced fat butters of the present invention. The product is consistent from batch-to-batch or run-to-run, and the product can be made without ultrafiltration machines and other expensive equipment.

Yet another advantage of the novel reduced fat content butter products disclosed herein is that they are essentially free from weeping and oiling out. Weeping is the exudation of liquid from butter or a butter product by syneresis, and oiling out is a similar phenomenon which results in a loss of fatty oils from butter or a butter product.

The objects, advantages, and important features of the present invention will be apparent to the reader from the foregoing and the appended claims and as the ensuing detailed description and discussion proceeds in conjunction with the accompanying drawing.

DETAILED DESCRIPTION OF THE INVENTION

Figure 1A:
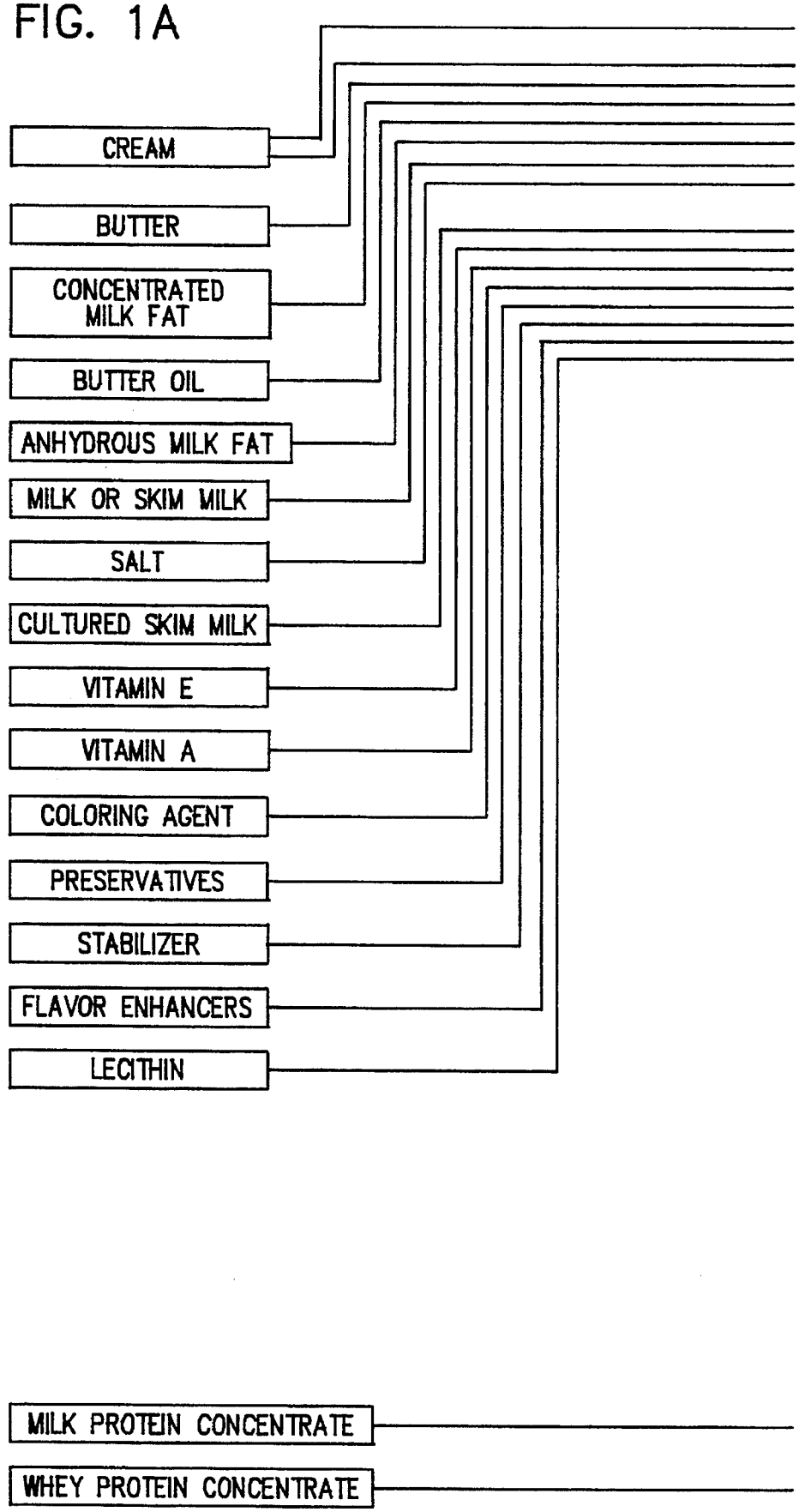
FIG. 1A and FIG. 1B together show, in block diagram form, one exemplary system for making reduced fat content butter products embodying the principles of the present invention.
Figure 1B:
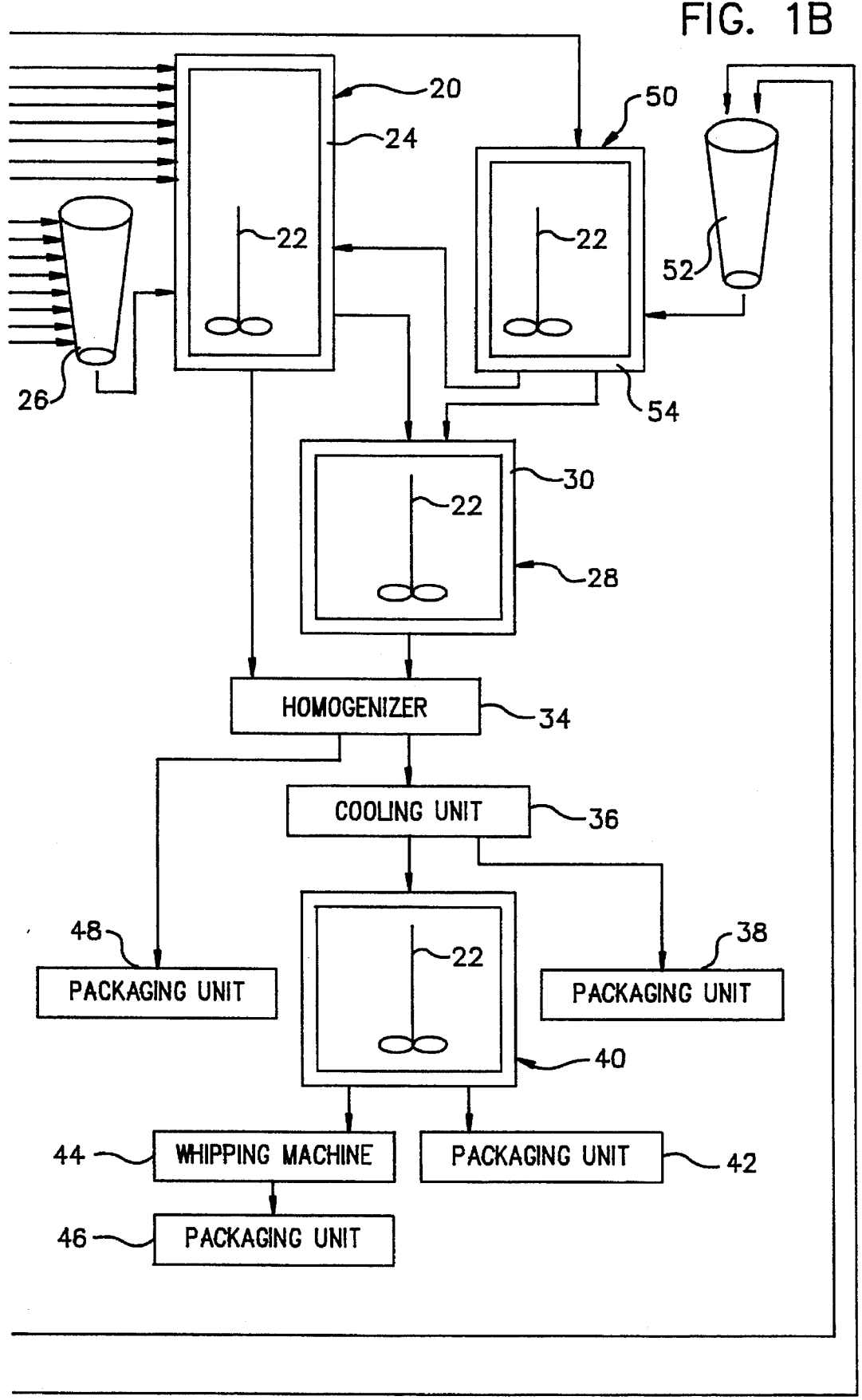

The novel, reduced fat content butter products of the present invention are made from sweet cream or whey cream (generically referred to herein as "dairy cream"). Products of optimal quality contain lecithin, which is a phosphatidyl choline commonly incorporated in a variety of food products for emulsifying, dispersing, and other properties, and a glyceride stabilizer utilized in combination with the lecithin to adjust the firmness, spreadability, and meltability of the product. A non-fat or other milk can be used to lower the fat content of the product, and dairy fats such as concentrated milk fat, dairy creams of higher fat content, conventional butter, anhydrous milk fat, and butter oil can be used to increase the product's fat content. A variety of optional ingredients can be employed to increase the nutritional value of the product; to inhibit oxidation of the product; to extend its shelf life; and to adjust the color, flavor, and texture of the product.

The general formula of the reduced fat content butter products of the invention appears in Table 1 below.

TABLE 1

| Essential Ingredient | Concentration (Weight Percent) |
| --- | --- |
| Dairy Cream | 25 to 99 |
| Optimal Product Ingredients | |
| Lecithin | 0.1 to 2.0 |
| Stabilizer | 0.1 to 2.5 |
| Optional Ingredients | |
| Milk Protein Concentrate | 0.5 to 4 |

TABLE 1-continued

| Essential Ingredient | Concentration (Weight Percent) |
| --- | --- |
| Whey Protein Concentrate | 0.1 to 3 |
| Cultured Skim Milk Powder | 0.1 to 3.0 |
| Salt | 0.25 to 2 |
| Vitamin E | 0.01 to 0.1 |
| Vitamin A | 0.005 to 0.009 |
| Coloring Agent | 0.0005 to 0.01 |
| Preservative | 0.016 to 0.05 |
| Microbial Culture(s) | 0.1 to 10 |
| Flavorants | 0.0005 to 0.05. |

The fat content of commercially available dairy creams ranges from 25 to 80 percent. The dairy cream may accordingly have a fat content exceeding that wanted in the reduced fat content butter product made from this base. In such circumstances, the cream is diluted with milk or a non-fat milk to bring the fat content of the product down to the wanted level.

In other circumstances, the cream may have a fat content lower than that wanted in the final product. In this case, concentrated milk fat, dairy cream with a higher fat content, butter, anhydrous milk fat, or butter oil may be employed to increase the fat concentration. Concentrated milk fat is a separated cream with a fat content of 80 percent. Anhydrous milk fat and butter oil are respectively made by removing the moisture from cream and churned butter. Both products have a fat content of 99.8 percent or higher.

Lecithin is employed in the reduced fat content butter products disclosed herein for its effect on texture and firmness of the final product, for its ability to inhibit syneresis, and for its emulsifying ability. This ingredient also can be employed to improve the melting characteristics of the product.

The preferred stabilizers are proprietary combinations of mono glycerides and diglycerides supplied by Grinstead Products, Inc. under the name Dimodan-O. Other, commercially available mono glyceride and diglyceride stabilizers may work well in adjusting firmness but those so far tried have given the product an off flavor. Other stabilizers such as gelatin may also be employed.

In conjunction with the lecithin, the pressure(s) under which the blend of selected ingredients is homogenized, and any protein concentrates that are employed, the glyceride stabilizer acts to impart the wanted degree of firmness to the reduced fat content butter product and to eliminate syneresis.

The milk protein concentrate and whey protein concentrate employed as optional ingredients in the reduced fat content butter products disclosed herein are commercially available powders. These ingredients are employed in the stated amounts to increase the protein level of the reduced fat content butter product, to adjust the firmness of the product, and/or to inhibit the exudation of moisture and oil from the product. Protein concentrates may be used to particular advantage in making a product with a firmness akin to that of conventional butter because the amount of stabilizer that would have to be used to obtain this degree of hardness may lock up the flavor of the product to an unacceptable extent.

Milk and whey protein concentrates contain from 30 to 85 percent protein. They are supplied in powder form and are soaked in the dairy cream, milk, or, less preferably, water at refrigeration temperature for typically 3 to 12 hours to rehydrate the powder and relax the proteins. Rehydration and relaxation are furthered by heating the blend in which the protein(s) are incorporated first to an elevated temperature and then reducing the temperature and holding the blend at refrigeration temperature.

Cultured skimmed milk, available under the trade name Microgard, acts as a shelf-life extender. It also tends to improve the flavor profile of the reduced fat content butter product.

Salt is a flavor enhancer and is omitted if an unsalted butter product is being made as it is in conventional butters.

Vitamin E is routinely added to a variety of food products as an antioxidant, and it is optionally employed in that capacity in the products disclosed herein.

As suggested above, vitamin A, preferably in the palmitate form, is employed only as necessary to ensure that the product contains enough vitamin A for it to be legally labeled as a butter.

Microbial cultures are optionally employed in lieu of, or in addition to, cultured skim milk to change the flavor profile of the reduced fat butter content product and/or to extend its shelf life. Any of the commercially available lactic cultures such as that supplied by LSI Specialty Products, Inc. can be employed for this purpose. The lactic culture is preferably added at a temperature of 70°–80° F. as it is most active and best able to fulfill its functions at temperatures in this range.

A conventional foodstuff coloring agent is optionally used to impart a richer yellow color to the reduced fat content butter products. Beta carotene is typically used for this purpose. Other coloring agents such as annatto can instead be used.

Literally hundreds of flavoring agents are available. Many of those which have been evaluated are unacceptable because they impart a margarinelike smell to the reduced fat content butter product. Flavorants that can however be employed to advantage in the reduced fat content butter products, especially those which have a low fat content and therefore tend to be perhaps less flavorable, are the flavor enhancers supplied by Grinstead. These additives enhance the flavor of the product without significant modification of flavor or other properties. Grinstead flavor enhancers are employed in extremely small amounts—typically on the order of 0.0025 percent, which works out to 8 grams of flavor enhancer for a 700 pound batch of product.

A number of conventional preservatives or shelf life extenders are available. A mixture of potassium sorbate and sodium benzoate in equal proportions has proven effective. The mixture of potassium sorbate and sodium benzoate preservatives may initially impart a slight bitter taste to the reduced fat content butter. However, that taste rapidly disappears and cannot be detected within a few days after the product is made.

Referring now to the drawing, the initial step in a typical application of the present invention is: (1) the reduction of the fat content of the butter product that is being made by the addition of a diluent—skim milk or milk—to the selected, sweet or whey cream, or (2) the addition of dairy fat (dairy cream of a higher fat content, butter, concentrated milk fat, butter oil, or anhydrous milk fat) to the cream to increase the fat content of the final product. This step is omitted if the cream has a fat content which will result in the product also having the wanted fat concentration.

To adjust fat content, the dairy cream and the selected diluent or dairy fat are introduced with agitation into an appropriate reactor such as the illustrated jacketed tank 20, which is equipped with an agitator 22.

Dairy fats are rigid at refrigeration temperatures. Therefore, if a dairy fat is being used to adjust fat content upwardly, the dairy cream is heated to a temperature above 100° F. through the introduction of steam into the jacketed interspace 24 of tank 20 before the fat is added to the cream.

At this point, and if they are to be used, the salt and microbial inhibiting cultured skim milk powder are also added to the cream or mix in the jacketed tank through a standard powder horn/venturi blender 26. This introduction takes place with agitator 22 running.

Next, and with agitator 22 still running, the other selected, optional ingredients are introduced into jacketed vessel 20.

The temperature of the process vessel contents (the feedstock) is then raised to a temperature in the range of 150° to 210° F. and preferably on the order of 195° F. by the continued introduction of steam into interspace 24. The contents are held at the selected temperature for a period long enough to pasteurize and develop the flavor desired in the material. Pasteurization is effected by holding the tank contents at the selected temperature for periods ranging from 45 minutes at 150° F. to 15 seconds at 210° F. Depending on the temperature, holding times of 15 seconds to three hours (including pasteurization time) are employed for flavor development with longer holding times at lower temperatures or higher temperatures being used to generate a nuttier flavor in the product.

Typically toward the end of pasteurization and flavor development, the lecithin is added. Introduction of the lecithin is deferred to this point in the process to minimize the exposure to elevated temperatures of this relatively heat-sensitive constituent. If pasteurization and/or flavor development is carried out at a temperature toward the upper end of the indicated range, the holding time at temperature may be so short that the lecithin can not be completely blended in during the hold time. In that case, the introduction of the lecithin is driven by blending time with the constituent being added early enough to ensure that it is fully blended.

The stabilizer can be added at the same point in the process as the lecithin. This is not essential, however, as the stabilizer can be mixed into the blend at any time the blend reaches a temperature of 135° F. or higher.

Next, the blend is discharged into agitator-equipped process vessel 28, which will also typically be a jacketed tank. Cold water is circulated through the interspace 30 of tank 28 to reduce the temperature of the pasteurized blend to a level at which that blend can be successfully homogenized. Homogenization can be carried out at a temperature as high as 165° F. but is preferably accomplished with the blend at a temperature in the range of 140° to 145° F.

The homogenizer 34 to which the blend is then transferred is preferably a two-stage device. In each stage, the pasteurized blend is forced through a small orifice under pressure against a steel plate to break down the globules of fat in the blend. By virtue of the fat globules being broken down and the mechanical forces imposed upon the constituents in the homogenizer, the completion of a phase reversal is effected. Thus, at the end of the homogenization step, the formation of an emulsion consisting of a liquid fraction of the blend dispersed in the fat particles is completed.

In the practice of the present invention, the first stage of a two-stage homogenizer can be operated at pressures in the range of 200–3000 psi and the second stage at pressures in the range of 100–2,000 psi with the total of the two pressures in the range of 300 to 5000 psig. A very definite correlation has been found between the pressures at which the homogenizer is operated and the character of the final product. The higher pressures produce firmer products and the lower pressures products which are spreadable, even at refrigeration temperatures.

Homogenization pressure alone cannot be safely relied upon to produce a product which is consistent from batch-to-batch. However, this important and necessary goal is obtained by synergistically employing in combination with selected homogenization pressures lecithin and a glyceride, gelatin, or other stabilizer in the concentrations identified above.

The product discharged from homogenizer 34 typically has a puddinglike consistency. That product is typically transferred to a cooling unit 36, which may be a swept surface heat exchanger. Here, the homogenized product is cooled from the homogenization temperature to a temperature in the range of 40° to 65° F. or even up to 80° F.

The homogenized and cooled material is transferred from cooling unit 36 directly to a packaging unit 38 or to a jacketed, agitator-equipped tank or other holding unit 40. From here the product may be routed to a filling machine or other packaging unit 42.

It is important, for the sake of consistency, that the product be packaged promptly. Otherwise the fats may crystalize as may a glyceride stabilizer if one is employed. This can significantly affect the firmness of the reduced fat butter and important organoleptic properties such as texture and mouthfeel. To avoid graininess and unwanted changes in firmness and organoleptic properties, packaging is preferably completed in not more than 15 minutes after the homogenized product is cooled to the packaging temperature.

Optionally, if a whipped butter product is to be made, the cooled product is transferred from holding unit 40 to a conventional whipping machine 44 such as the model CM-15 manufactured by Goodway Industries, Inc. Here, the product is agitated and nitrogen is incorporated into it to generate a stable, light, porous structure and to inhibit oxidation of the product. The texture of the whipped product can be controlled by regulating the flow of the product through the whipping machine, the agitator speed, the whipping chamber pressure, and the pressure on the nitrogen within the whipping head.

For the Goodway machine, agitator speeds ranging from 200 to 2,000 rpm, nitrogen injection pressures of 10 to 40 psi, and whipping chamber pressures in the range of 10 to 30 psi have been found satisfactory. Different parameters may of course be found superior, or even necessary, depending upon the particular whipping machine that is being employed.

The whipped product is transferred from machine 44 to a conventional filling or other packaging machine 46 designed for whipped products and promptly packaged for the reasons discussed above.

It is also possible to package the product directly as it is discharged from homogenizer 34 as indicated by reference character 48. For example, products of the character described above have been discharged directly from homogenizer 34 into five gallon buckets lined with plastic bags which are folded around the product to squeeze out air and then sealed.

As time passes, the physical nature of the product changes. Importantly, it becomes more firm although, if wanted, still soft enough to be spreadable at room and refrigeration temperatures. The involved processes are completed in 12 hours to six days, depending on the cooling rate, which is determined in large part by the size of the container; and the reduced fat content butter products remain stable thereafter.

If the blend in process vessel 20 contains a protein concentrate, the rehydration process must be completed before the blend is pasteurized because the minimum preferred pasteurization temperature is 150° F., and completion of the rehydration process is preferably carried out at a temperature of not more than 145° F. This is because higher temperatures tend to harden the protein concentrates, and this can impart a gritty mouthfeel to the final product.

As suggested above, the initial step in rehydration is carried out at refrigeration temperatures by soaking the protein concentrate(s) in cream, milk, or, less preferably, water. The rehydration process is continued in the system shown in the drawing by blending the partially rehydrated proteins with the dairy cream in jacketed, agitator-equipped process vessel 50 and holding the mixture in that vessel at temperature to promote rehydration. The protein concentrates are introduced by means of powder horn/venturi blender 52 with the agitator 22 in process tank 50 running. After the protein concentrate(s) have been introduced, steam is let into jacketed interspace 54.

In a typical run, the introduction of steam is continued until the temperature of the mix is raised to 145° F. In this typical run, the mixture of dairy cream and protein concentrate(s) is held at the 145° F. temperature for 25 minutes to further the rehydration reactions. Next, chilled water is circulated through the jacketed interspace 54 of vessel 50 to cool the mix to a temperature in the 35°–45° F. range. Depending upon the concentration of proteins in the mix, it is held at this low temperature for 3–12 hours. This completes the rehydration of the proteins, which is carried out at this lower temperature so that the dairy cream will not spoil during the rehydration step.

Once rehydration is completed, the cream with its burden of rehydrated proteins is transferred to reactor 20, and the process of making the selected product continues as discussed above.

Variations in the rehydration steps just described may of course be employed. For example, the mixture of cream and protein concentrate(s) may be transferred from vessel 50 to tank 20 and there cooled and held to complete the rehydration step. Another viable alternative is to add optional product constituents such as vitamins, coloring agents, and preservatives in vessel 50 while the protein concentrate(s) are being blended with the cream in that vessel.

Also within the scope of the present invention are products made as discussed above but without lecithin and/or stabilizers. Such products may tend to exhibit syneresis and to melt less smoothly than those in which lecithin and stabilizers are employed, and less control over the texture of the final product is afforded. Otherwise, the products are often comparable, especially as far as flavor and spreadability at refrigeration temperatures are concerned. Also, the manufacturing process is the same except for the omission of the lecithin and/or stabilizer, particularly in that the fat content of the product is adjusted as discussed above and the same optional ingredients can be employed.

The illustrated system is for a batch-type process. A continuous process can be obtained by adding a second jacketed process vessel like the one identified by reference character 20 and operating first one process vessel and then the other.

The following examples describe in detail the manufacture of representative reduced fat and light butters and a reduced fat content butter product specifically intended for commercial bakeries, all formulated in accord with, and made by processes employing, the principles of the present invention.

EXAMPLE I

Spreadable, Forty Percent Fat, Lite (Light) Butter

Reduced fat butters formulated and prepared as described in this example are entitled to be labeled as "Lite" or "Light" because the fat content of the product is 50 percent or less of that of the reference food (conventional, full fat butter), see Baking & Snack, January 1993, p. 57.

The taste of the reduced fat butter closely resembles that of a lightly salted churned butter; and the product is readily spreadable, even at a refrigeration temperature of 35°–45° F.

The ingredients of the spreadable, forty percent fat, light butter are listed in Table 2 below.

TABLE 2

| Ingredient | Weight | Weight Percent |
| --- | --- | --- |
| Sweet Cream | 613.40 lbs | 81.295 |
| Skim Milk | 121.21 lbs | 16.064 |
| (Sweet cream and skim milk combined to obtain a milk fat concentration of 41 percent) | | |
| Salt | 9.18 lbs | 1.217 |
| Lecithin | 3.67 lbs | 0.486 |
| Cultured Skim Milk (Microgard) | 2.94 lbs | 0.390 |
| Vitamin E | 66.70 gms | 0.0195 |
| Vitamin A | 10.84 gms | 0.0032 |
| Beta Carotene | 4.09 gms | 0.0012 |
| Preservatives | | |
| Potassium Sorbate | 53.36 gms | 0.016 |
| Sodium Benzoate | 53.36 gms | 0.016 |
| Glyceride Stabilizer (Dimodan-O) | 3.68 lbs | 0.4873 |
| Flavorants | | |
| Grinstead Q301-18-1 | 8.34 gms | 0.0024 |
| Grinstead WONF 3121 | 8.34 gms | 0.0024 |

The cream and skim milk were supplied to the process at refrigeration temperature.

Dimodan-O resembles a block of paraffin at room temperature. It is heated to a temperature of 135° F. or higher to melt the product before it is added to the heated feedstock.

The remaining ingredients are supplied to the process at room temperatures.

The spreadable forty percent fat, light butter was made in the system illustrated in the drawing, employing the process steps described above and the following process parameters:

| Process Vessel 20 | |
| --- | --- |
| Pasteurization and Flavor Development Temperature | 193° F. |
| Holding Time at Temperature | 40 mins |
| Agitator Speed | 25 rpm |
| Holding Vessel 26 | Bypassed |
| Cooling Vessel 28 | |
| Hold Time | Until the pre-homogenization temperature reached |
| Final Product Temperature | 145° F. |

| Homogenizer 34 (Gaulin Two-Stage) | |
| --- | --- |
| First Stage Pressure | 1200 psig |
| Second Stage Pressure | 600 psig |
| | Total = 1800 psig |
| Cooling Unit 36 (Swept Surface Heat Exchanger) | |
| Pre-Packaging Product Temperature | 55° F. |

The melted glyceride stabilizer was added to the mixture while it was being held at 193° F.

Five minutes prior to the end of the 40 minute hold time, the lecithin was added to the mixture.

The cooled product was packaged in 10 ounce plastic tubs and refrigerated at 40° F.

After 60 hours, 12 containers of the finished product were opened and evaluated. The following observations were made:

1. Pleasant butterlike aroma;
2. Smooth, creamy, soft texture;
3. Easily spreadable at refrigerated temperature.
4. Light, clean butter flavor;
5. No "greasy" aftertaste as was experienced with conventional, full fat butter;
6. If the product is frozen, it has a tendency to become crumbly. Whipping with a standard household hand mixer will restore the product to a consistency similar to its original consistency.

Twelve more containers were opened and evaluated after having been stored at 40° F. for 10 days. The evaluation showed no noticeable changes from the observations made after 60 hours.

EXAMPLE II

Reduced Fat Printable Butter (48 Percent Fat)

The most common form in which butter is currently sold in retail outlets is quarter pound cubes or sticks usually packaged in units of four. In food service markets, the foil wrapped "Continental" style, single serve pat of butter is used. Described in this example are the formulation and processing of a butter reduced in fat content by 40 percent which is relatively firm and able to be printed for the foregoing and other applications.

The ingredients of the 48 percent fat printable butter are listed below in Table 3.

TABLE 3

| Ingredient | Weight | Weight Percent |
| --- | --- | --- |
| Sweet Cream | 441.8 lbs | 80.5789 |
| Anhydrous Milk Fat | 73.7 lbs | 13.4425 |
| (Sweet cream and anhydrous milk fat combined to obtain a milk fat concentration of 51 percent) | | |
| Milk Protein Concentrate (82 percent protein) | 15.576 lbs | 2.8197 |
| Whey Protein Concentrate (85 percent protein) | 2.233 lbs | 0.4042 |
| Salt | 6.49 lbs | 1.1749 |
| Lecithin | 2.596 lbs | 0.4700 |
| Cultured Skim Milk | 2.077 lbs | 0.3760 |

TABLE 3-continued

| Ingredient | Weight | Weight Percent |
|---|---|---|
| (Microgard) | | |
| Vitamin E | 47.13 gms | 0.01879 |
| Vitamin A | 7.68 gms | 0.00306 |
| Beta Carotene | 5.80 gms | 0.00231 |
| Glyceride Stabilizer (Dimodan-O) | 3.894 lbs | 0.70494 |
| Flavorants: | | |
| Grinstead Q301-18-1 | 5.90 gms | 0.00235 |
| Grinstead WONF 3121 | 5.90 gms | 0.00235 |

The 48 percent fat, printable butter was made in the system illustrated in the drawing, employing the following process steps and process parameters:

The cream was supplied to process vessel 50 at refrigeration temperature, 40° F.

The powdered protein concentrates, the salt, and the cultured skim milk powder were supplied to process vessel 50 at room temperature and mixed into the cold cream. The agitator speed was 25 rpm.

The mixture of cream, protein, salt, and cultured skim milk was heated to 145° F. and held at that temperature for 25 minutes.

While the mixture was being held at the 145° F. temperature, the anhydrous milk fat, Vitamin E, Vitamin A, beta carotene, and flavorants were added to the mixture and blended in with agitator 22 running at 25 rpm.

The resulting mixture was cooled at the end of the 25 minute hold period to 35° F. by circulating ice water through the jacket of the process vessel. The mixture was held at that temperature for 12 hours.

The mixture was then heated at 185° with the agitator running at 25 rpm for 30 minutes for pasteurization and flavor development.

During the 185° F., 30 minute pasteurization and flavor development step, the glyceride stabilizer was melted and introduced into the mixture in the same way as in the Example I process.

After 25 minutes of the 30 minute hold time had elapsed, the lecithin was added to the mixture and blended by the agitator.

The pasteurized blend was transferred to process vessel 28 and cooled to a pre-homogenization temperature of 145° F. This was followed by homogenization carried out as follows:

Homogenizer 34 (Gaulin Two-Stage)

| First Stage Pressure | 1200 psig |
|---|---|
| Second Stage Pressure | 600 psig |
| Total = | 1800 psig |

The homogenized product was packaged at 145° F. in bulk containers and refrigerated at 40° F. After 5 days, 5 containers were opened and evaluated, The following observations were made:
1. The texture of the product was quite firm and similar to regular butter at refrigerated temperatures;
2. Pleasant butterlike aroma;
3. Visual appearance similar to full fat butter;
4. Light, clean, butter flavor;
5. Clean, smooth mouthfeel.

Following the observations above, the product was packaged with traditional butter packaging equipment in one-pound boxes each containing four quarter-pound sticks. The sticks were foil wrapped to keep moisture from escaping and allowing oxidation to occur on the surface of the packaged product.

The packaged butter was placed in refrigeration at 40° F. After 48 hours, the finished product was opened and evaluated. The following observations were made:
1. The texture of the butter was slightly soft at refrigerated temperature. However, it had adequate firmness to maintain its shape;
2. The product was spreadable at refrigerated temperature but not as spreadable as the product made by the Example I process;
3. The flavor of the product was not as pronounced but was acceptable;
4. The flavor was light, clean, and buttery without any greasy aftertaste;
5. The product had a tendency to dry out slightly if left uncovered for several hours. This can be easily avoided by storing the product in a butter dish after the package is opened;
6. As a fresh dairy product, the product must be refrigerated when not in use in order to avoid spoilage;
7. If the product is frozen, it will lose its emulsion and become crumbly.

EXAMPLE III

Forty-eight Percent Fat Spreadable Butter

A reduced fat butter with 40 percent less fat than the minimum allowed in conventional butter made in accord with the principles of the present invention is a particularly superior product in many respects. It can be used as a table spread; and the results are excellent when it is used for sauteing, baking, candymaking, etc.

The formulation and process parameters for a representative 48 percent fat spreadable butter appear below in Table 4.

TABLE 4

| Ingredient | Weight | Weight Percent |
|---|---|---|
| Sweet Cream | 445 lbs | 76.600 |
| Butter | 122 lbs | 21.001 |
| (Dairy cream and butter were combined to obtain a fat concentration of 49 percent) | | |
| Salt | 7.09 lbs | 1.2200 |
| Lecithin | 2.84 lbs | 0.4888 |
| Cultured Skim Milk (Microgard) | 2.27 lbs | 0.3907 |
| Vitamin E | 51.48 gms | 0.0195 |
| Vitamin A | 8.39 gms | 0.0032 |
| Beta Carotene | 3.16 gms | 0.0012 |
| Preservatives | | |
| Potassium Sorbate | 41.19 gms | 0.0156 |
| Sodium Benzoate | 41.19 gms | 0.0156 |
| Stabilizer (Dimodan-O) | 1.42 lbs | 0.2444 |

The cream and butter were supplied to the process at refrigeration temperature.

The vegetable mono and diglyceride stabilizer was heated to a temperature above 135° F. to melt the product. The stabilizer was a liquid when added to the process vessel.

The remaining ingredients are supplied to the process at room temperature.

The 48 percent fat spreadable butter was made in the system illustrated in the drawing, employing the process steps described above and the following process parameters.

| Process Vessel 20 | |
| --- | --- |
| Pasteurization and Flavor Development Temperature | 193° F. |
| Holding Time at Temperature | 40 mins |
| Agitator Speed | 25 rpm |
| Holding Vessel 26 | Bypassed |
| Cooling Vessel 28 | |
| Hold Time | 15 mins |
| Pre-Homogenization Product Temperature | 145° F. |
| Homogenizer 34 (Gaulin Two-Stage) | |
| First Stage Pressure | 1000 psig |
| Second Stage Pressure | 500 psig |
| | Total = 1500 psig |
| Cooling Unit 36 (Swept surface heat exchanger) | |
| Pre-Packaging Product Temperature | 55° F. |

The cream, butter, salt, cultured skim milk, Vitamin E, Vitamin A, beta carotene, and preservatives were mixed together and heated for pasteurization and flavor development.

During the time that the product was held at 193° F., the melted glyceride stabilizer was added and blended into the mix.

Five minutes prior to the end of the 40 minute hold time, the lecithin was added to the mix.

The cooled product was packaged in 10-ounce plastic tubs and placed in refrigeration at 40° F. After 60 hours, 12 containers of the finished product were opened and evaluated. The following observations were made:

1. Pleasant butterlike aroma;

2. Smooth, creamy, soft texture;

3. Easily spreadable at refrigeration temperature;

4. Light, clean, butter flavor. The flavor was somewhat more pronounced than that of the products described in Example I and Example II. The increased fat level and smaller level of stabilizer appear to be the reason for the flavor improvement;

5. No greasy aftertaste and mouthfeel as was experienced with full fat butter;

6. As a fresh dairy product, the product must be refrigerated when not in use in order to avoid spoilage;

7. If the product is frozen, it has a tendency to loose its emulsion and become crumbly.

Twelve more containers were opened and evaluated after having been stored at 40° F. for 10 days. The evaluation at that time showed no noticeable changes from the observations made after 60 hours.

EXAMPLE IV

Commercial Bakery Butter Product

There are applications where commercial bakers can use reduced fat content butter products containing levels of fat varying between 48 percent and 75 percent. The objective is to limit the fat content of their finished baked goods to a level as low as possible while still maintaining acceptable product quality.

This example describes a formulation and a set of parameters which can be used with the illustrated system to make a butter for commercial bakers. The fat level can be set at any point desired; however, the product described in this example had a fat level of 60 percent.

The ingredients of the commercial bakery butter are listed below in Table 5.

TABLE 5

| Ingredient | Weight | Weight Percent |
| --- | --- | --- |
| Sweet Cream | 426 lbs | 59.056 |
| Concentrated Milk Fat | 280 lbs | 38.816 |
| (Sweet cream and concentrated milk fat were combined to obtain a milk fat concentration of 61 percent.) | | |
| Salt | 8.825 lbs | 1.2234 |
| Lecithin | 3.53 lbs | 0.4894 |
| Cultured Skim Milk (Microgard) | 2.824 lbs | 0.3915 |
| Vitamin E | 64.1048 gms | 0.0195 |
| Vitamin A | 10.4488 gms | 0.0031 |
| Beta Carotene | 3.9324 gms | 0.0011 |

The cream and concentrated milk fat were supplied to the process at refrigerated temperature. The remaining ingredients were supplied at room temperature.

The commercial bakery butter was made by following the procedure of Example I except:

(1) the preservatives, the glyceride stabilizer, and the flavorants were not used in this product;

(2) instead of using skim milk to reduce the fat content of the cream, concentrated milk fat was used to increase the fat level of the cream;

(3) the homogenization pressures were adjusted to: first stage=800 psig, second stage= 400 psig (total pressure 1200 psig);

(4) the product was packaged in bulk in 68 pound butter boxes lined with plastic bags immediately following the homogenization process and placed in refrigeration.

Evaluation of the product after 4 days at refrigerated temperature was as follows:

1. Pleasant, butterlike aroma;

2. Texture was smooth and creamy, but not soft. It was rather rigid and firm;

3. Light, clean, butter flavor more pronounced due to the increased fat level;

4. Product had very much the same appearance as full fat butter. However, the lower fat content was noticeable on the palate due to the lack of the greasy feel in the mouth experienced with full fat butter;

5. The product requires refrigeration and becomes crumbly when frozen.

EXAMPLE V

Reduced Fat Butter (25 Percent Fat Content)

This ultralight butter is intended for those who wish to use butter but must, or wish, to minimize their fat intake. It was pointed out above that a reduced fat butter with a minimum fat content as described in this example may taste noticeably less flavorful than conventional butter. According to the present invention, however, this disadvantage is overcome by the judicious use of appropriate flavor enhancers.

The ingredients of the reduced, 25 percent fat butter are listed below in Table 6.

TABLE 6

| Ingredient | Weight | Weight Percent |
|---|---|---|
| Sweet Cream | 240.71 lbs | 59.07 |
| Whole Milk | 153.96 lbs | 37.78 |
| (Sweet cream and whole milk blended to provide a milk fat concentration of 26 percent) | | |
| Salt | 4.06 lbs | 1.0 |
| Lecithin | 1.97 lbs | 0.485 |
| Cultured Skim Milk (Microgard) | 2.37 lbs | 0.582 |
| Vitamin E | 44.72 gms | 0.0242 |
| Vitamin A | 7.29 gms | 0.00397 |
| Beta Carotene (Oil Soluble) | 2.19 gms | 0.0012 |
| Beta Carotene (Water Soluble) | 3.94 gms | 0.00213 |
| Preservatives: | | |
| Potassium Sorbate | 43 gms | 0.023 |
| Sodium Benzoate | 43 gms | 0.023 |
| Glyceride Stabilizer (Dimodan-O) | 3.95 lbs | 0.972 |
| Flavorant: | | |
| Grinstead Q301-18-1 | 35.84 gms | 0.0196 |
| Grinstead WONF 3121 | 17.92 gms | 0.0094 |

The cream and whole milk were supplied to the process at refrigerated temperature. The remaining ingredients were supplied at room temperature.

The reduced, 25 percent fat butter was made following the procedure of Example I except:

(1) whole milk was used to reduce the fat concentration of the cream rather than skim milk;

(2) the salt level was reduced due to the higher moisture content anticipated in the final product;

(3) the cultured skim milk concentration was increased;

(4) the Vitamin E and Vitamin A concentrations were increased;

(5) the preservative concentration was increased;

(6) the vegetable mono and diglyceride stabilizer concentration was increased;

(7) the flavorant concentration was increased;

(8) the homogenization pressure of the first stage was 1400 psig. The second stage pressure was 700 psig. The total pressure was 2100 psig.

The product was packaged in 5-gallon plastic buckets immediately following the homogenization process and placed in refrigeration.

Evaluation of the product after 4 days at refrigerated temperature was as follows:

1. Pleasant aroma. However, it resembled margarine rather than butter;

2. Texture was quite soft;

3. Mouthfeel was smooth;

4. Flavor was closer to margarine flavor rather than butter. The flavor was not objectionable, only different from conventional butter;

5. This product also requires refrigeration and becomes crumbly when frozen.

EXAMPLE VI

Whipped, Light, Forty Percent Fat Butter

In order to provide a whipped butter with 50 percent less fat for those who prefer a spread of this character, the product described in this example was made.

The procedure of Example I was repeated except:

(1) The product discharged from cooling unit 36 was processed through a CM-15 Goodway whipping unit prior to packaging. The whipping head was spun at 1000 rpm, the chamber pressure at the whipping head was 20 psig, the feed pump was run at 65 percent of maximum speed, and the nitrogen pressure setting was at 20 lbs;

(2) The product was packaged in 10 ounce plastic containers and 15 ounce ultra can containers and refrigerated.

The evaluations described in Example I were made of the product described in this example, and the results were the same except:

(1) The whipped product was softer and more spreadable than the Example I product;

(2) The flavor profile seemed to be more pronounced.

EXAMPLE VII

Whipped, 48 Percent Fat, Spreadable Butter

In order to compare the light whipped butter of Example VI with a whipped butter containing 8 percent more fat, the product described in this example was made.

The procedure of Example III was repeated except:

(1) When the product exited cooling unit 36, it was processed through the Goodway Machine. The whipping head was spun at 850 rpm, the chamber pressure at the whipping head was 20 psi, the feed pump was run at 60 percent of maximum speed, and the nitrogen pressure setting was 20 psig;

(2) The product was packaged in 10 ounce plastic containers and refrigerated.

The evaluations described in Example III were conducted, and the results were the same except:

(1) The whipped product was softer and more spreadable than the Example III product;

(2) The flavor profile seemed to be more pronounced than that of the Example III product.

EXAMPLE VIII

Forty-eight Percent Fat Spreadable Butter

The reduced fat butter was made following the procedure of Example III except:

(1) The vegetable mono and diglyceride stabilizer (Dimodan-O) was omitted from the formulation and replaced with an equal concentration of Knox unflavored gelatin (U.S.P.) dissolved in milk or water;

(2) The homogenization pressures were raised to 1400 psig first stage and 700 psig second stage for a total pressure of 2100 psig;

(3) The product was packaged immediately following homogenization.

The product was packaged in 3 pound containers and cooled for 18 hours. The evaluation of the finished product was as follows:

1. Very soft consistency;

2. Very smooth texture;

3. Excellent flavor profile;

4. Excellent mouthfeel.

EXAMPLE IX

Forty-Eight Percent Fat Spreadable Butter

This reduced fat butter was made following the procedure of Example III except:

(1) the stabilizer was omitted;

(2) the lecithin was omitted;

(3) the homogenization pressures were adjusted to 1800 psig first stage and 900 psig second stage, total of 2700 psig;

(4) the product was packaged immediately following the homogenization process.

The product was packaged in 3 pound containers and cooled for 18 hours. The evaluation of the finished product was as follows:

1. Very soft consistency, but expected to firm with more time;

2. Very smooth and creamy;

3. Flavor profile light and buttery;

4. Excellent mouthfeel.

EXAMPLE X

Reduced, Forty-Eight Percent Fat Spreadable Butter

The product was made following the procedures described in Example II except:

(1) the lecithin was omitted;

(2) the stabilizer was omitted;

(3) dairy cream and conventional butter were combined to obtain a fat concentration in the mix of 48 percent;

(4) the product was homogenized at a total pressure of 1200 psig with the first stage setting being 800 psig and the second stage setting being 400 psig;

(5) the product was packaged in 5 quart containers for evaluation.

The evaluation of the above product was carried out after 3 days. The results were as follows:

1. Aroma was pleasant and butterlike;

2. Smooth, creamy texture;

3. Flavor profile was pleasant and butterlike;

4. Soft and spreadable at refrigerated temperature;

5. Slight condensation on the surface of the product.

After 10 days, the product was evaluated again. The results were the same except:

1. Where an indentation had been made in the surface of the product, some syneresis had occurred.

EXAMPLE XI

Forty-eight Percent Fat Spreadable Cultured Butter

This product was made following the procedure described in Example III except:

(1) following the homogenization process, the product was only cooled to a temperature of 80° F.;

(2) a lactic culture (LSI Speciality Products, Inc.) at a concentration of 1 percent by weight was introduced into the product and blended by stirring;

(3) the product was left at room temperature for 48 hours;

(4) the product was then refrigerated for 48 hours;

(5) the product was then packaged in 16 ounce containers and evaluated as follows:

1. Product had a strong flavor profile. Typical culture flavor;

2. Texture was very smooth and spreadable;

3. Mouthfeel was good.

EXAMPLE XII

Forty-Eight Percent Fat Butter Spreadable Butter

This product was made following the procedure described in Example II except:

(1) the lecithin was omitted;

(2) the stabilizer was omitted;

(3) whey cream was used instead of sweet cream;

(4) the whey cream was combined with conventional butter to obtain a fat concentration of 48 percent;

(5) the product was homogenized at a total pressure of 1200 psig (first stage pressure of 800 psig and second stage of 400 psig);

(6) the product was packaged in 5 quart containers and refrigerated following homogenization.

The product was evaluated after 24 hours. The results were as follows:

1. Aroma was slightly cheeselike;

2. Flavor profile was noticeably different from products made with sweet cream;

3. Slight culture flavor;

4. Smooth, creamy texture;

5. Soft and spreadable at refrigeration temperature.

The invention may be embodied in many forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A method of making a butter product which comprises the steps of: providing a feedstock comprising sweet cream or whey cream and having a fat content of at least 25 percent and sequentially pasteurizing said feedstock and homogenizing the pasteurized feedstock; the providing, pasteurization, and homogenizing of the feedstock being so carried out as to effect a phase reversal and the formation of an emulsion of feedstock liquid in feedstock fat.

2. A method as defined in claim 1 in which lecithin is combined with the feedstock after the feedstock has been at least partially heated to a pasteurization temperature in an amount sufficient to affect the firmness of the product.

3. A method as defined in claim 1 which includes a stabilizer in an amount sufficient to affect the firmness of the product.

4. A method as defined in claim 3 which includes a gelatin or glyceride stabilizer.

5. A method as defined in claim 1 in which one or more of the following optional ingredients are blended with the sweet cream or whey cream:

| Ingredient | Weight Percent |
| --- | --- |
| Milk Protein Concentrate | 0.1 to 4 |
| Whey Protein Concentrate | 0.25 to 3 |
| Cultured Skim Milk Powder | 0.01 to 1 |
| Salt | 0.25 to 2 |
| Vitamin E | 0.001 to 0.04 |
| Vitamin A | 0.005 to 0.009 |
| Coloring Agent(s) | 0.0005 to 0.002 |
| Preservative(s) | 0.016 to 0.05 |
| Microbial Culture(s) | 0.1 to 10 |
| Flavorant(s) | 0.0005 to 0.01. |

6. A method as defined in claim 5 in which a milk or whey protein concentrate is combined with the cream, in which said concentrate is partially rehydrated before it is combined with the cream, and in which a blend containing the cream and the concentrate is heated at an elevated temperature prior to the pasteurization step to further the rehydration of the proteins in the concentrate.

7. A method as defined in claim 6 in which the blend is subsequently cooled to a refrigeration temperature and held at that temperature until the rehydration of the proteins is essentially complete.

8. A method as defined in claim 1 in which a fluffy texture is imparted to the product by whipping and introducing a gas into the homogenized material.

9. A method as defined in claim 1 in which milk or non-fat milk is blended with the cream to lower the fat content of the product.

10. A method as defined in claim 1 in which a concentrated milk fat, dairy cream of higher fat content, conventional butter, butter oil, or anhydrous milk fat is blended with the cream to increase the fat content of the product.

11. A method as defined in claim 1 in which pasteurization is effected at a temperature in the range of 150° to 210° F. for a time ranging from 15 seconds at a temperature of 210° F. to 45 minutes at a temperature of 150° F.

12. A method as defined in claim 11 in which the material being pasteurized is heated for from 15 seconds at a temperature of 210° F. to up to three hours at a temperature of 150° F. to pasteurize and to develop flavor in the product.

13. A method as defined in claim 1 in which the blend is homogenized in a two-stage homogenizer with the blend being forced under pressure against an impact surface in each of said stages to reduce fat globules in the blend and promote a phase reversal and the homogenizer is operated at a pressure of 200 to 3,000 psi in the first stage and at a pressure in the range of 100 to 2,000 psi in the second stage.

14. A method as defined in claim 13 in which the total of the pressures in the two stages is in the range of 300 to 5000 psi.

15. A method as defined in claim 1 in which the blend is homogenized at a temperature in the range of 130° to 165° F.

16. A method as defined in claim 1 in which homogenization is followed by the prompt packaging of the homogenized material.

17. A method as defined in claim 16 in which the material is first cooled to a temperature in the range of 40° to 80° F. and then packaged.

18. A reduced fat content butter product made by a method as defined in claim 1.

19. A product as defined in claim 18 which is spreadable at refrigeration temperature.

20. A product as defined in claim 18 which has a fat content of not more than 60 percent.

21. A product as defined in claim 18 which has a fat content of not more than 40 percent.

22. A butter product as defined in claim 18 which has a relatively low fat content and contains at least one flavor enhancer.

23. A method of making a butter product which comprises the steps of providing and then pasteurizing a feedstock comprising dairy cream, combining lecithin and a stabilizer with the pasteurized feedstock, and homogenizing the blend obtained by combining the lecithin and the stabilizer with the feedstock, the providing and pasteurization of the feedstock and the homogenizing of the blend being so carried out that a phase reversal is effected and the butter product is a liquid in fat emulsion.

24. A method as defined in claim 23 in which the stabilizer is solid at room temperature and is combined with the feedstock only after said feedstock has been heated to a temperature above the melting point of the stabilizer.

25. A method as defined in claim 23 in which the lecithin is combined with the feedstock only after said feedstock has been heated to thereby limit the exposure of the lecithin to thermal degradation.

26. A method as defined in claim 23 in which the dairy cream, the lecithin, and the stabilizer are employed in the following amounts:

| Ingredient | Weight Percent |
| --- | --- |
| Dairy cream | 26 to 99 |
| Lecithin | 0.1 to 2.0 |
| Stabilizer | 0.1 to 2.5. |

27. A method as defined in claim 23 in which the dairy cream is sweet cream or whey cream.

28. A method as defined in claim 23 in which the stabilizer comprises a glyceride or a gelatin.

29. A method as defined in claim 27 in which the stabilizer is a mixture of mono glycerides and diglycerides.

30. A method as defined in claim 23 in which one or more of the following optional ingredients are blended with the dairy cream:

| Ingredient | Weight Percent |
| --- | --- |
| Milk Protein Concentrate | 0.1 to 4 |
| Whey Protein Concentrate | 0.25 to 3 |
| Cultured Skim Milk Powder | 0.01 to 3 |
| Salt | 0.25 to 2 |
| Vitamin E | 0.001 to 0.1 |
| Vitamin A | 0.005 to 0.009 |
| Coloring Agent(s) | 0.0005 to 0.01 |
| Preservative(s) | 0.016 to 0.05 |
| Microbial Culture(s) | 0.1 to 10 |
| Flavorant(s) | 0.0005 to 0.05. |

31. A method as defined in claim 30 in which a milk or whey protein concentrate is combined with the dairy cream, in which said concentrate is partially rehydrated before it is combined with the blend, and in which a blend containing the dairy cream and the concentrate is heated at an elevated temperature prior to the pasteurization step to further the rehydration of the proteins in the concentrate.

32. A method as defined in claim 31 in which the blend is subsequently cooled to a refrigeration temperature and held at that temperature until the rehydration of the proteins is essentially complete.

33. A method as defined in claim 23 in which the amount of the lecithin and the stabilizer and the homogenization of the blend are so coordinated as to impart a desired firmness to the product.

34. A method as defined in claim 23 so carried out that the homogenized material is predominantly a liquid-in-fat dispersion produced by a phase reversal.

35. A method as defined in claim 23 in which a fluffy texture is imparted to the product by whipping and introducing a gas into the homogenized material.

36. A method as defined in claim 23 in which a milk or non-fat milk is blended with the dairy cream to lower the fat content of the product.

37. A method as defined in claim 23 in which a concentrated milk fat, a dairy cream of higher fat content, conventional butter, butter oil, or anhydrous milk fat is blended with the dairy cream to increase the fat content of the product.

38. A method as defined in claim 23 in which pasteurization is effected at a temperature in the range of 150° to 210° F. for a time ranging from 15 seconds at a temperature of 210° F. to 45 minutes at a temperature of 150° F.

39. A method as defined in claim 23 in which the material being pasteurized is heated for from 15 seconds at a temperature of 210° F. to up to three hours at a temperature of 150° F. to pasteurize and to develop flavor in the product.

40. A method as defined in claim 23 in which the blend is homogenized in a two-stage homogenizer with the blend being forced under pressure against an impact surface in each of said stages to reduce fat globules in the blend and the homogenizer is operated at a pressure of 200 to 3,000 psi in the first stage and at a pressure in the range of 100 to 2,000 psi in the second stage.

41. A method as defined in claim 40 in which the total of the pressures in the two stages is in the range of 300 to 5000 psi.

42. A method as defined in claim 23 in which the blend is homogenized at a temperature in the range of 130° to 165° F.

43. A method as defined in claim 42 in which homogenization is followed by the prompt packaging of the homogenized material.

44. A method as defined in claim 43 in which the material is first cooled to a temperature in the range of 40° to 80° F. and then packaged.

45. A reduced fat content butter product made by a method as defined in claim 23.

46. A product as defined in claim 45 which is spreadable at refrigeration temperature.

47. A product as defined in claim 45 which has a fat content of not more than 60 percent.

48. A product as defined in claim 45 which has a fat content of not more than 40 percent.

49. A product as defined in claim 45 which has a relatively low fat content and contains at least one flavor enhancer.

* * * * *